Dec. 25, 1934.　　　　R. J. NORTON　　　　1,985,515
BRAKE TESTING STRUCTURE
Original Filed March 25, 1929　　2 Sheets-Sheet 2
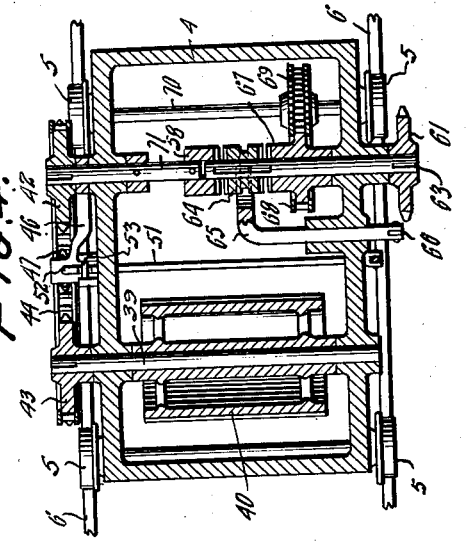
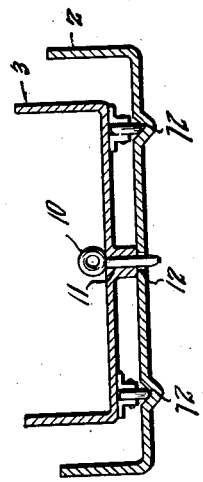
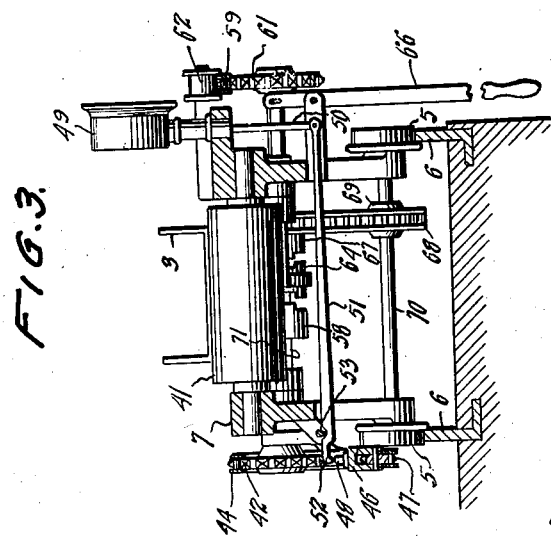
Inventor
RAYMOND J. NORTON
By Semmes & Semmes
Attorneys Patented Dec. 25, 1934

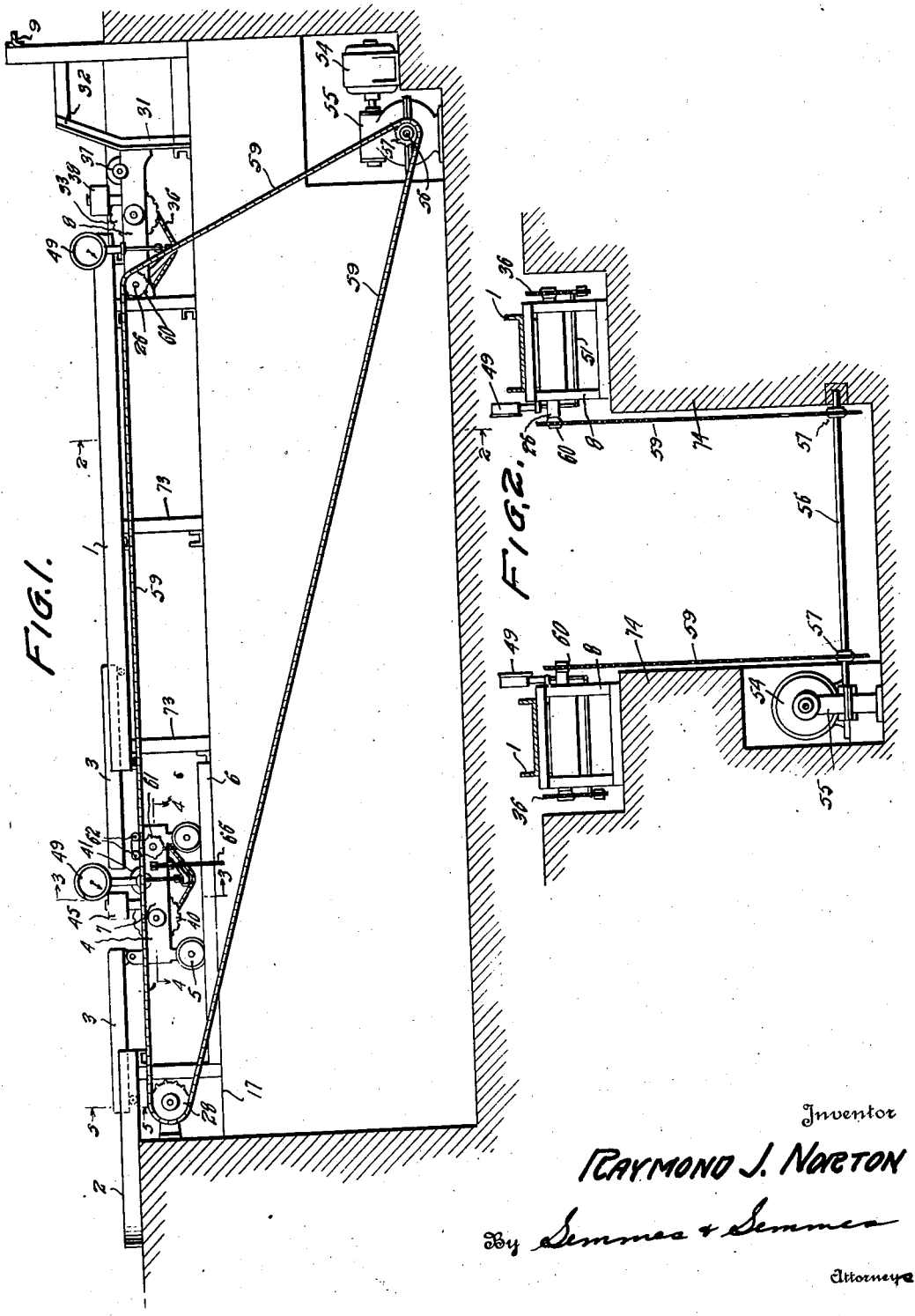

1,985,515

UNITED STATES PATENT OFFICE 1,985,515

BRAKE TESTING STRUCTURE

Raymond J. Norton, Washington, D. C., assignor to Bendix-Cowdrey Brake Tester, Inc., New York, N. Y., a corporation of Delaware Original application March 25, 1929, Serial No. 349,793. Divided and this application January 25, 1930, Serial No. 423,465

5 Claims. (Cl. 73—51)

This application is a division of my copending application Serial No. 349,793 filed March 25, 1929 which has resulted in Patent No. 1,946,101, dated Feb. 6, 1934.

This invention relates to brake testing devices and pertains more specifically to testing apparatus for automotive vehicles.

In the past a number of mechanisms for testing the brakes on automotive vehicles have been proposed. Many of these are adapted to test only one wheel at a time and hence necessitate a considerable expenditure of time to complete the testing operation. Others are constructed to test two or more wheels simultaneously, but are so designed as to preclude a facile adjustment to variant wheel base lengths and ready accessibility to the several brakes.

It is an object of the present invention to provide a testing apparatus which simultaneously indicates the retardation of each of the wheel brakes.

Another object is to provide a testing apparatus for a vehicle having brakes on four wheels, which is readily adjustable to accommodate differential wheel bases.

Yet another object is to provide a testing apparatus of the class described, which is so designed as to provide a clear space between the wheels on each side of the vehicle.

A further object is to provide an apparatus which is adjustable to varying wheel bases, and which is operable from a single source of power.

With these and other important and related objects in view the invention contemplates the provision of a testing assembly which includes testing units for the front and rear wheels in conjunction with a source of power which is adapted not only to actuate a plurality of the units, but also to relatively displace the units so as to accommodate cars of differential wheel bases.

In order to render the invention readily understood, a preferred modification is shown in the accompanying drawings in which:

Figure 1 is a longitudinal vertical section of the present embodiment of my invention.

Figure 2 is a vertical section taken along the line 2—2 of Figure 1.

Figure 3 is a vertical section of one of my movable tester units taken along the line 3—3 of Figure 1.

Figure 4 is a horizontal section of the same structure taken along the line 4—4 of Figure 1.

Figure 5 is a vertical section along the line 5—5 of Figure 1, illustrating the manner of supporting and locking the movable trackways 3.

As shown in the drawings, the apparatus comprises a pair of parallel trackways 1, which are adapted to be set in a pit or mounted upon suitable supports and provided with a suitable ramp. The trackways may be channel shaped in cross section and serve to receive the wheels of the vehicle to be tested.

Positioned near one end of the trackway 1 is a second set of permanent trackways 2. It will be noted that the trackways 2 are aligned with and spaced from the trackways 1. Fitting in and bridging the space between the tracks 1 and 2 are the ways 3, which are secured to and movable with the carriage 4. If desired, the lower edges of each of the ways 3 may be provided with anti-friction devices 72 to diminish the sliding friction between them and the permanent ways. All of the permanent trackways are supported by a frame structure 73, which, together with the tracks 6, is fixed to the base 74.

The carriage 4 is provided at its base with a plurality of rollers or wheels 5, which are mounted on the tracks or guideways 6. It will be seen that if a force is properly applied to the carriage, this may be displaced longitudinally and will carry with it the ways or runners 3. These latter will slide upon the permanent ways 1 and 2 and will thus maintain in effect a continuous trackway for the reception and passage of a vehicle wheel on and off the carriage.

Mounted on each carriage is a brake testing device designated generally by the numeral 7. As will be described more in detail hereinafter, this is driven by a motor through a flexible driving connection and is adapted to rotate a wheel against the resistance of its brake. The reaction or resistance set up by the brake is utilized to vary the tension on the driving mechanism and this variance is utilized to actuate a brake indicating device.

Positioned near the front end of each trackway 1 is a second testing device 8, comparable in most respects to that mounted on the movable carriage 4. As has been indicated hereinbefore, one object of the present invention is to provide a testing unit for four wheel brakes which is adjustable longitudinally to conform to cars of different wheel bases. In the present device, as will have been appreciated, this adjustment may be made by moving the carriage 4 longitudinally of the frame. The carriage 4 is designed to receive the rear wheels of the vehicle, but it is obvious that, if desired, the testing units for the rear wheels may be fixed in position and the testing units of the front wheels made displaceable, as by mounting them on movable carriages.

Since the adjustment may readily be made by moving only one set of testers at one end of the car, I prefer to permanently fix the tester units 8 with respect to the frame. As the units 8 are relatively immovable, the trackway 1 may be closely juxtaposed thereto so that the front wheels of the vehicle may pass over these ways and directly onto the testing units.

It is desirable for obvious reasons to anchor the car to the testing device during the testing operation. This may readily be done by securing the car in any desired manner to the frame cross member 9. Where it is planned to move the car forwardly on the trackways 1 and back it off after the test is completed, this cross member may comprise a permanent member which projects upwardly of the track. If, however, it is desired to remove the car from the testing apparatus by moving it forwardly, the cross member 9 may be pivotally connected to the frame so that it may be swung downwardly and out of the path of the vehicle.

The movable carriages are usually positioned near the forward end of the assemblage, that is, in that position which will accommodate a car of the shortest wheel base. When a car is to be tested, it is moved onto the trackway until the front wheels rest on the driving rollers of the forward testing machines. If the car has a wheel base which is longer than the distance between the front and rear set of testers, the latter may be moved rearwardly until its rollers are in operative position beneath the rear driving wheels. The carriage may be locked in this position by the pins 10, which are received in the aligned apertures 11 and 12 of the trackways 3 and 2, respectively.

To effect this displacement of the carriage a number of specific mechanisms may be employed. If desired, the rear or driving wheels of the vehicle may be rotated by operation of the vehicle motor. These wheels frictionally engage the trackway 3 and will rearwardly displace the latter and the connected carriage. When the carriage is moved into operative or testing position, the driving wheels may be stopped and the carriage then locked.

While the carriage may be displaced in the manner described, it is preferable to drive it from a source of power which is independent of the vehicle motor. In this way the brakes may be tested while the engine motor is being repaired. To accomplish this the carriage is associated with a driving mechanism which is actuated by the same motor which is used for testing the brakes on the wheels. In this manner a single source of power is utilized to effect the preliminary adjustment as well as the actual brake test.

In the present embodiment a single source of power is employed to actuate all four brake testing units. As shown in the drawings, the electric motor 54 is located in a suitable space provided in one end of the pit over which the brake testing mechanism is located. The shaft of the motor 54 is connected to a speed reducing device 55, the driven shaft 56 of which extends across the pit. The shaft 56 is preferably located so as not to interfere with the action of a man in the pit. Shaft 56 carries a pair of sprockets 57, each of which is associated with a chain 59 so as to drive the same. The chain 59 passes over a sprocket 60 carried by the stationary testing unit 8 and over a fixed sprocket 28 positioned at the other end of the pit. Movable carriage 4 is provided with a sprocket 61 adapted to cooperate with chain 59. A plurality of rollers 62 are positioned on the carriage 4 in such a manner as to retain chain 59 in engagement with the teeth of sprocket 61.

As is clearly shown in the drawings, sprocket 61 is fixed to a shaft 63 carried by carriage 4. A clutching element 64 is slidably connected to shaft 63 and is provided with a groove with which is associated actuating device 65 which in turn is operated by a lever 66. Rotatably mounted on shaft 63 is a sprocket 67 over which passes a chain 68, by means of which sprocket 67 is connected with a sprocket 69 fixed to shaft 70, to which are fixed rollers 5 for moving the carriage 4 on the track 6. The clutching element 64 and sprocket 67 are equipped with dogs adapted to cooperate with each other to effect engagement to cause sprocket 67 to rotate with shaft 63.

Thus, when it is desired to move carriage 4 to adjust it to a particular vehicle, lever 66 is operated to effect engagement between the clutching element 64 and sprocket 67. When the chain 59 is moved, rotary motion will be imparted to shaft 63 which in turn through sprocket 67, chain 68 and sprocket 69 will cause wheels 5 to rotate, thereby moving the carriage 4 to a desired position. Carriage 4 also carries a shaft 71, to which is attached a clutching collar 58 adapted to be engaged by the clutching element 64. Shaft 71 also carries a sprocket 42, over which passes a chain 44, which engages with a sprocket 43, fixed to a shaft 39 carrying a wheel rotating roller 40. Carriage 4 also carries wheel positioning and guiding rollers 41 and 45 respectively.

It will be appreciated that when a retarding force is applied to the wheel rotating roller, the tension in the driving chain 44 will be correspondingly increased; consequently the tension in the flexible driving element, which is a function of the retarding force, can be measured by various means, one form of which is shown in the accompanying drawings. The structure for measuring the tension in the flexible driving element will be described in connection with the movable testing unit 4, but I wish it to be clearly understood that the same type of structure is associated with each of the four testing units.

As shown in the drawings, an arm 46 is pivotally mounted on shaft 71. The free end of this arm is bifurcated and supports a shaft on which is mounted an idling roller or sprocket 47, adapted to engage the portion of chain 44 which is under tension when transmitting power from shaft 71 to roller 40. The upper portion of the bifurcated end of the arm 46 is equipped with an adjustable bearing member 48. As the tension in chain 44 increases, there will be a tendency for the portion of the chain under tension to straighten out. This tendency will effect an upward movement of the bifurcated end of the arm 46.

The force tending to straighten the portion of chain 44 under tension is measured by a load indicating instrument 49. An actuating rod 50 is associated with the instrument 49 and is pivotally connected with a balance beam 51. The free end of the beam 51 is provided with a knife edge 52, which engages the bearing member 48. Knife edge 53, carried by the carriage, serves as a fulcrum for the beam 51. From the foregoing description it will be appreciated that any tendency of the portion of chain 44 under tension to straighten will be transmitted through the beam structure to the indicating instrument 49.

Since the force exerted on the knife edge carried by lever 51 is a function of the tension in the chain 44, which in turn is a function of the retarding force applied to roller 40 by applying the brake to a vehicle wheel supported thereon, the load indicated on the dial of instrument 49 may be used to compute the torque and brake resistance of the brake carried by the vehicle wheel in terms of other physical quantities. In the preferred embodiment of this invention the indicating instrument is modified somewhat; that is, the dial is calibrated so that the pointer directly indicates brake resistance in terms of retarding torque.

These calibrations may be made, as will be understood, by measuring the torque of the testing unit when operated against varying torques imposed and indicated by a suitable prony brake or other dynamometer. Since the reading on the dial of the instrument is proportionate to the increased resistance exerted by the brake application, the calibration may be easily made. The actual calibration of a given unit will, of course, depend upon the ratio of the portions of the balance beam, the angularity of the several portions of the chain under tension, and other conditions.

The testing unit 8 is mounted on a frame structure 31 which is provided with a bumper 32 to prevent a vehicle from overrunning the testing structure. Wheel engaging roller 33, corrugated to increase the frictional engagement with a vehicle tire, is rotatably mounted on the frame 31. Shaft 26 and the shaft to which roller 33 is fixed carry sprockets over which a driving chain 36 passes. An idling wheel positioning roller 37 is spaced from roller 33 to properly position the vehicle wheel thereon. The frame 31 also carries a vertically positioned guide roller 38 to prevent the vehicle wheel from slipping off the wheel rotating roller.

The mode of operation of the tester will have been appreciated from the foregoing description. A vehicle, the brakes of which are to be tested, is run on to the trackways 1, until the front wheels engage with the wheel rotating rollers 33 carried by the testing units 8. The chassis of the vehicle is secured to the crossbar 9 by means of a chain or other device.

The lever 66 is then shifted so that the clutching elements 64 on the units 7 are actuated in such a manner that sprockets 67 will rotate with shafts 63, to which are connected sprockets 61, engaged by the chains 59. Upon energizing the motor 54, shaft 56 will be rotated through the speed reduction device 55, and chains 59 will pass over the several sprockets and will impart rotary motion to the shafts 63, which in turn will cause rollers 5 to rotate thereby moving the carriages 4 to the desired location suitable for testing a particular vehicle. As the carriages 4 are adjusted to the desired position, the motor 54 is shut off, and clutching elements 64 are shifted into engagement with the clutching collars 58 secured to shafts 71.

When the chains 59 are moved, shafts 63 and 71 will be rotated and the rotary motion will be imparted to wheel rotating rollers 40. Also rotary motion will be imparted to the sprockets 60 carried by testing units 8 and rotary motion will be transmitted through the mechanism to the wheel rotating rollers 33. Upon applying the brakes to retard the rotation of vehicle wheels, tension in the chains 44 and 36 will be increased and this tension in the chains will be indicated on the dials of the instruments 49 in terms of brake retardation.

When used for operating the testing units, the motor need run only in one direction; however, when used for shifting the movable carriages, the motor employed may be of the reversible type, or suitable reversing gearing can be interposed between the motor and the carriage shifting mechanisms to effectively move the carriages in the desired direction.

In the foregoing description reference has been made to a clutch or coupling as shown in the drawings. As illustrated, this clutch is provided with portions adapted to engage members to be rotated therewith; however, it is within the concept of the present invention to employ clutches of the friction type, which may be actuated without shutting off the supply of power.

As shown in the drawings, power is transmitted in several instances by chains. I wish it to be clearly understood, however, that other flexible means may be employed in appllying the concept of this invention to practical structure. For purposes of convenience the construction of only one side of the brake tester contemplated by this invention has been described in detail, but I wish it to be clearly understood that each side of the complete testing structure is similar to the other; similar parts of each side have been indicated by similar reference numerals.

It will be appreciated that I have provided a very simple and effective structure for simultaneously testing all of the brakes of an automotive vehicle. The apparatus employed in the brake tester construction and in accordance with my invention embodies the use of simple and easily obtainable standard equipment, which may be kept in proper condition with a minimum amount of care.

Because of the simplicity of the herein described structure and the placing of the several units and their driving mechanism, ample unoccupied space is provided in which a mechanic may work and adjust the brakes being tested. The structure contemplated by this invention is also advantageous in that the movable carriages may be adjusted to the desired position with a minimum amount of exertion on the part of the operator.

While I have shown and described the preferred embodiment of my invention, I wish it to be understood that I do not confine myself to the precise details of construction herein set forth by way of illustration as it is apparent that many changes and variations may be made therein by those skilled in the art without departing from the spirit of the invention or exceeding the scope of the appended claims.

I claim:

1. A device for testing the brakes of a vehicle comprising a pit having sides and ends, brake testing units arranged on opposite sides of the pit, means arranged within the pit and at one end thereof for simultaneously driving said units to rotate the wheels of the vehicle against the resistence of their respective brakes, means to individually measure the resistance of each brake, and means for coupling said first mentioned means with said units, arranged along the inside walls of said pit.

2. A device for testing the brakes of a vehicle comprising a pit having sides and ends, brake testing units arranged on opposite sides of the pit, means arranged within the pit and at one end thereof for driving said units to rotate the wheels of the vehicle against the resistance of their respective brakes, means to individually measure the resistance of each brake, and flexible means for coupling said first mentioned means with said units, arranged along the inside walls of said pit.

3. A device for testing the brakes of a vehicle comprising a pit having sides and ends, brake testing units arranged on opposite sides of the pit, a pair of said units being movable to accommodate vehicles of different wheelbase, means arranged within the pit and at one end thereof for driving said units to rotate the wheels of the vehicle against the resistance of their respective brakes, means to individually measure the resistance of each brake, and flexible means for coupling said first mentioned means with said units, arranged along the inside walls of said pit.

4. A device for testing the brakes of a vehicle comprising a pit having sides and ends, testing units arranged on opposite sides of the pit, two of which units are arranged to be moved longitudinally of the pit to accommodate vehicles of different wheelbase, a motor adjacent one end of the pit, a shaft coupled to the motor and extending transversely across the pit, and two endless flexible bands, each coupling one end of said shaft to two of said units means to longitudinally displace the movable units by the said motor.

5. In an apparatus for testing the brakes of a vehicle, the combination of a front frame, a rear frame, spaced pairs of rotors mounted for rotation in said frames, respectively, a shaft rotatably mounted in said rear frame, rollers for movably supporting said rear frame, means for rotating said shaft, and driving connections between said shaft and at least one of said rollers.

RAYMOND J. NORTON.